UNITED STATES PATENT OFFICE.

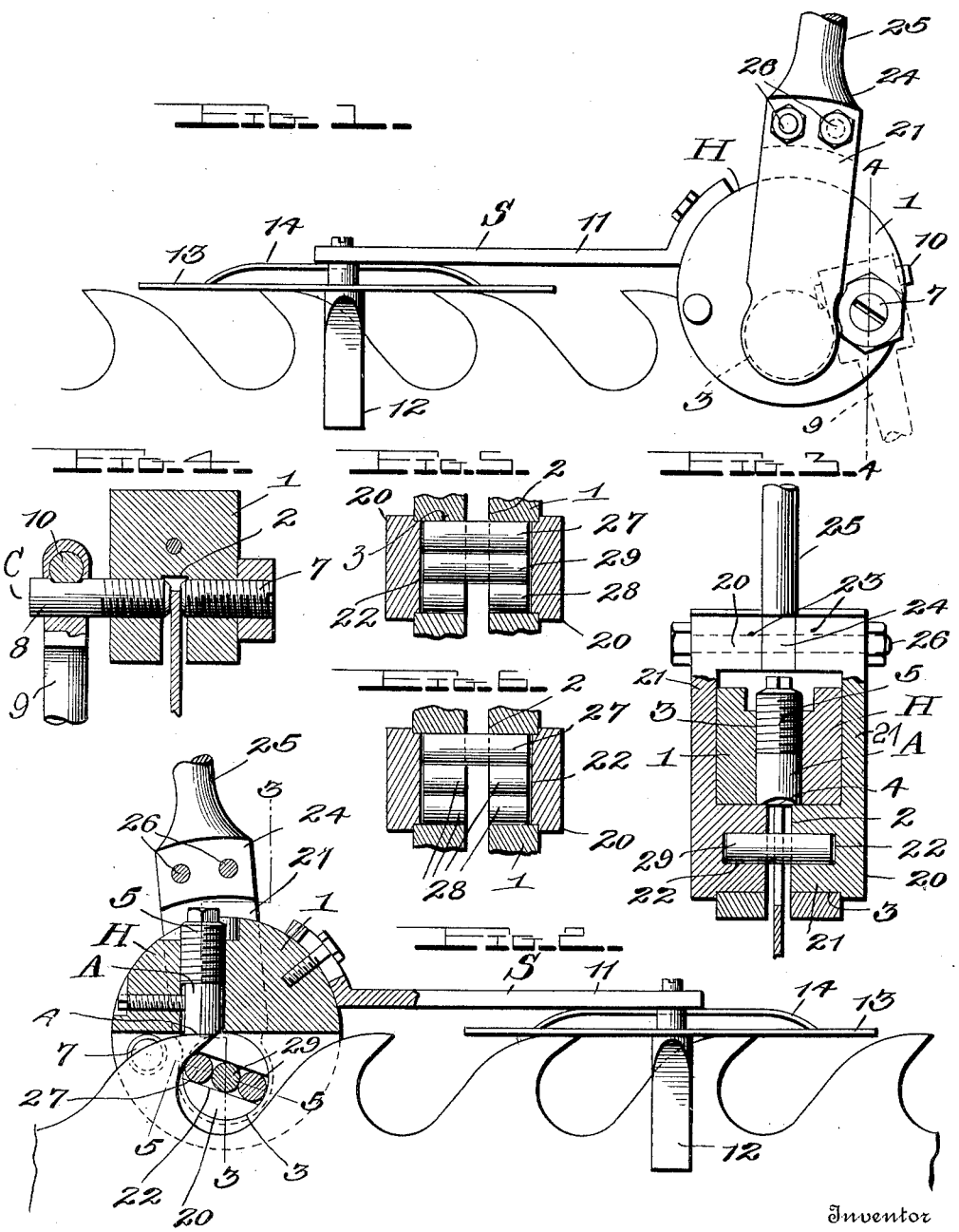

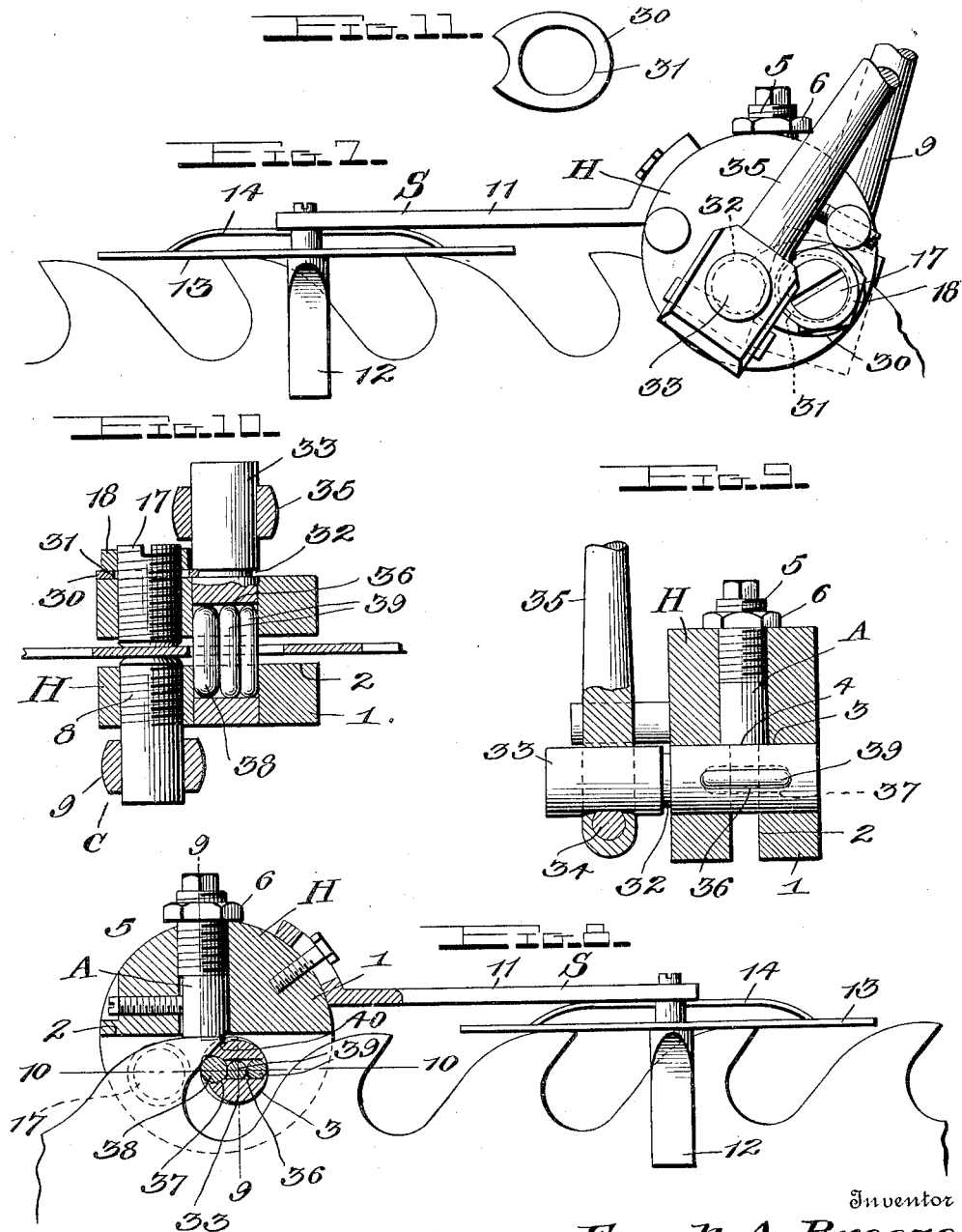

FRANK A. BREEZE, OF NEWBURGH, ONTARIO, CANADA.

SAW-SWAGE.

1,089,313. Specification of Letters Patent. Patented Mar. 3, 1914.

Application filed July 28, 1913. Serial No. 781,619.

*To all whom it may concern:*

Be it known that I, FRANK A. BREEZE, a subject of the King of England, residing at Newburgh, in the county of Lennox and Addington, Ontario, Canada, have invented certain new and useful Improvements in Saw-Swages; and I do declare the following to be a full, clear, and exact description of the invention, such as will enable others skilled in the art to which it appertains to make and use the same.

This invention relates to the making of metal tools and implements, and more especially to saw swages; and the object of the same is to produce a tool of this character wherein the swage is pushed toward the anvil by cam action resulting from its eccentric position within the mandrel, which latter is rotated within the head by the usual or any well known means. This and other objects are carried out by constructing the tool in the manner hereinafter more fully described and claimed and as shown in the drawings wherein—

Figure 1 is a side elevation showing my invention in its preferred form, and Fig. 2 is a longitudinal sectional view thereof. Fig. 3 is a cross section on the line 3—3 of Fig. 2, and Fig. 4 a section on the line 4—4 of Fig. 1. Figs. 5 and 6 are sectional details of two forms of the die-roller and its anti-friction rollers, taken on about the line 5—5 of Fig. 2. Fig. 7 is a side elevation of another form of my invention, and Fig. 8 a longitudinal sectional view through the same. Fig. 9 is a cross section on the line 9—9 of Fig. 8, and Fig. 10 is a horizontal section on the line 10—10 of Fig. 8. Fig. 11 is a detail of the locking plate.

Referring now more particularly to Sheet 1 of the drawings wherein the preferred form of my invention is illustrated, the head H of this tool which carries the anvil A is shown as disposed upon the edge of the saw by means of a support S and a saw clamp C, and said head also carries the swage and its actuating mechanism which forms the subject matter of the present invention. The head is by preference a round block 1 of steel slitted across one edge as at 2 for the reception of the saw teeth and provided with an off-center recess 3. The anvil A has any suitable form of active face 4 which is projected into said slit and toward said recess by any suitable means but preferably by a set screw 5 whose rear end is accessible from the outer face of the head. The clamp is herein illustrated as consisting of a set screw 7 threaded into an opening in one of the walls which forms said slit, and a second set screw 8 opposite thereto and actuated by means of a handle 9 which is adjustably mounted on the outer end of this set screw as by means of a key 10. According to the thickness of the saw blade, the two set screws are adjusted to center the blade within said slit and hold it firmly in position to be acted on by the swage; and then, when the handle 9 is turned in the proper direction, its set screw 8 is retracted to release the blade as when the saw must be moved along for another tooth. In addition to the clamp some support S is necessary for holding this device upon the toothed edges of the saw, and by preference it comprises a projecting arm 11 extending some distance to the rear of said head and provided with two depending fingers 12 which stand astride the saw blade and carry a plate 13 pressed downward with yielding force by means of a spring 14. I may here say that the same general features of construction are employed in the type of my tool illustrated on Sheet 2 of the drawings excepting that a jam nut 6 is there shown as added to the set screw 5 of the anvil, and the screw 7 of the clamp is replaced by a screw 17 which is held by a jam nut 18 which serves a function hereinafter set forth. No novelty is claimed for the parts thus far described.

Coming now to the details of my invention, and particularly that type thereof which is illustrated on Sheet 1 of the drawings, the swage comprises a mandrel rotatably mounted within the recess 3, a roller-supported die carried thereby, and peculiar means for actuating this mandrel and separating the two parts of which it is composed. Said parts 20 are alike, and a description of one will suffice. It is a cylindrical stud projecting into the recess 3 from a fork arm 21, and the inner ends of the two studs are spaced from each other the width of the slot or slit 2, and slotted as at 22, the slots standing in strict alinement with each other. The arm 21 moves along one face of the head H, and its outer end carries a lug 23 projecting toward the similar lug on the other arm. Between these lugs is disposed a head 24 at the inner end of a lever 25 which constitutes the handle by means of which the swage is turned, and through the two lugs and the head pass bolts 26, locking all parts removably together. The die is made up of a long roller 27 extending across the space between said studs and to the bottoms of the slots therein, and two anti-friction rollers behind said long roller. These anti-friction rollers may be each in two members as seen at 28, or they may be of full length as seen at 29, and by preference I would supply each tool with two two-part anti-friction rollers or two full length anti-friction rollers. When the distance between the saw teeth permits, I would employ all three full-length rollers, when this distance is less, I would employ two full-length rollers and a two part roller at what might be called the rear end of the slots, and when the teeth are quite near together I would employ a full-length die-roller and two pairs of shorter anti-friction rollers behind it. The latter are of such length as to leave spaces between their contiguous ends through which the saw teeth may pass as the drawings show, and in any event the die-roller is of sufficient size to span the space between the inner ends of said studs and to do its work without being injured. The diameter of these rollers and the width of said slots are such that the aggregated diameter of the three rollers equals the diameter of the studs constituting the mandrel; but the disposition of the active face 4 of the anvil is such that when the mandrel is rotated by means of its handle 25, the die-roller flattens out the saw tooth in a well known manner. Thereafter the handle is moved in the opposite direction, the handle 9 of the saw clamp C is moved to release the saw blade, and the same is moved forward and set in the head H prior to swaging of the next tooth. When the teeth stand in such proximity that three full-length rollers cannot be employed, the bolts or screws 26 are removed and the fork-arms 21 with the studs 20 of the mandrel drawn apart, and this action permits the rollers to fall out so that one pair or both pairs of the half-length or two-part anti-friction rollers may be employed as suggested above, and when these are used the saw tooth next to that being acted on can pass between their contiguous ends in a manner which will be clear.

In the type shown on Sheet 2 of the drawings the same general features of construction are employed as referred to above, excepting that under the jam nut 18 which surrounds the set screw 17 of the saw clamp, I dispose a plate 30 having a slot 31 through its body whereby it stands astride said set screw and may be moved thereon when the jam nut is loosened. The inner end of this plate (when the latter is pushed forward or inward) engages a groove 32 in the mandrel and by this simple device the latter is held against displacement from the head H. In this type of my invention the mandrel is all in one piece or stud 33, and the handle 35 is keyed as at 34 to one end of said stud. The latter has a transverse slot 36 made wider at one end as at 37, and in the wider portion is disposed the die-roller 38, and anti-friction rollers 39 are disposed in the narrower portion of the slot or behind or beneath said die-roller. Here again the aggregated diameters of the three rollers is the same as the diameter of the stud 33, and therefore when the locking plate is retracted so as to disengage the mandrel, the same with the rollers can be withdrawn from the recess in the head. As there are not two studs in this instance and a space between them into which the active face 4 of the anvil may project, I cut a groove 40 around the mandrel in a plane at right angles to its axis, or at least around that portion thereof which passes across the wider end of the slot in which is located the die-roller, and therefore when the saw is adjusted and the parts stand at rest the tooth to be acted on must project into this groove. As with the tool first described above, the handle is then manipulated to turn the mandrel within the recess in the head and the die-roller flattens out the tip of the saw tooth in a well known manner. Thereafter the handle 35 is restored to its normal position, the clamp C is manipulated to release the saw blade, and the latter is advanced through the tool for a distance of one tooth so that the action can be repeated on the next.

The feature common to both types of the invention, and on which I rely for the chief novelty of my present invention, are the fact that the die-roller is supported within the mandrel (whether the latter be in one piece or two) by two anti-friction rollers, whether the latter be full length or in two pieces each. If the active face 4 of the anvil is a fixed piece of steel which overlies the tip of the saw tooth, it will be clear that the latter is swaged by a die which rolls beneath said tip rather than sliding beneath it as is so common in tools of this character; and the great force necessary to swage the tooth is secured by having the mandrel turn freely as far as possible consistent with good work, while the die roller is supported therein by means of two anti-friction rollers behind it—that one which is at the center of the length of the slots rotating in a direction the reverse of that followed by the die, and the remaining or rearmost anti-friction roller rotating in a direction which is the same as that followed by the die and bearing on the farther face of the recess 3 in the head. If now the extremities of all rollers be rounded as shown or perhaps made conical, friction is reduced to a minimum, and the rotation of the mandrel within a round recess in the head serves only the purpose of changing the relative position of the line of rollers across said recess, while the rollers touch each other and the walls of the slot and the rear wall of the recess along fine lines where there can be but little friction, and even at these points they have rolling contact. I would prefer to employ that type of my invention shown on Sheet 2 when the saw teeth are rather close together and the saw is small; but the preferred form of my invention, which is perhaps more costly to manufacture, had better be employed on large saws. As above suggested, those features of this tool which are commonly used in saw swages form no part of the present invention and are illustrated on the drawings merely for the purpose of showing how the complete tool is preferably manufactured and how it operates. I can, of course, replace those features with others of any suitable type, and I also reserve the right to make such changes in the novel portions of this tool as come within the spirit of the appended claims. The proportions and materials of parts are not essential to the successful operation of my device.

What is claimed as new is:

1. In a saw swage, the combination with a head having a transverse recess and a peripheral slit intersecting the same, and an anvil whose active face stands within said slit; of a mandrel rotatably mounted within said recess and having a transverse slot, a die roller mounted in one end of said slot, and anti-friction devices within said slot behind said roller.

2. In a saw swage, the combination with a head having a transverse recess and a peripheral slit intersecting the same, and an anvil whose active face stands within said slit; of a mandrel rotatably mounted within said recess and having a transverse slot, a die roller mounted in one end of said slot, and two anti-friction rollers mounted in said slot behind the die roller with the rearmost anti-friction roller bearing on the remote wall of said recess.

3. In a saw swage, the combination with a circular head having an off-center recess therethrough and a peripheral slit intersecting said recess, and an anvil whose active face stands within said slit; of a mandrel rotatably mounted within said recess and having a transverse slot extending across the slit in the head, a handle projecting radially from the end of the mandrel and moving across one end of the head, a die roller mounted in one end of said slot, and two anti-friction rollers mounted in said slot behind the die roller with the rearmost anti-friction roller bearing on the remote wall of said recess.

4. In a saw swage, the combination with a head having a transverse recess and a peripheral slit intersecting the same, and an anvil whose active face stands within said slit; of a mandrel consisting of two studs rotatably mounted in said recess and having their inner ends spaced a distance equal to the width of said slit and their bodies transversely slotted in alinement with each other, a handle connected with the outer ends of said studs whereby the latter are rotated in unison, a die roller located within one end of the registering slots within said studs and anti-friction devices behind said roller.

5. In a saw swage, the combination with a head having a transverse recess and a peripheral slit intersecting the same, and an anvil whose active face stands within said slit; of a mandrel including two studs rotatably mounted in said recess in alinement with each other, a handle connected with the outer ends of said studs whereby the latter are rotated in unison, a die roller located within one end of the registering slots within said studs and two-part anti-friction rollers within said slots behind the die roller with the continguous ends of the parts spaced from each other, for the purpose set forth.

6. In a saw swage, the combination with a head having a transverse recess and a peripheral slit intersecting the same, and an anvil whose active face stands within said slit; of a mandrel consisting of two studs rotatably mounted in said recess and having their inner ends spaced a distance equal to the width of said slit and their bodies transversely slotted in alinement with each other, fork-arms connected with the outer ends of said studs and moving over the ends of the head, the outer extremities of said arms having lugs projecting toward each other, a hand lever having a head disposed between the inner faces of said lugs, and bolts through the lugs and head, for the purpose set forth.

In testimony whereof I have hereunto set my hand in presence of two subscribing witnesses.

FRANK A. BREEZE.

Witnesses:
  GEO. H. SMYTHE,
  FLORA M. ELDER.